US 6,735,256 B1

(12) United States Patent
Toshimitsu

(10) Patent No.: US 6,735,256 B1
(45) Date of Patent: May 11, 2004

(54) RADIO COMMUNICATION SYSTEM, RADIO COMMUNICATION METHOD, RADIO BASE STATION, AND RADIO TERMINAL STATION

(75) Inventor: Kiyoshi Toshimitsu, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 800 days.

(21) Appl. No.: 09/662,121

(22) Filed: Sep. 14, 2000

(30) Foreign Application Priority Data

Sep. 28, 1999 (JP) .............................. 11-275225

(51) Int. Cl.$^7$ ................................. H04K 1/10
(52) U.S. Cl. ...................................... 375/260
(58) Field of Search ................................ 375/260, 285; 370/390; 455/69, 522; 340/7.22

(56) References Cited

U.S. PATENT DOCUMENTS

| 5,517,507 A | | 5/1996 | Needham et al. | |
| 5,577,024 A | | 11/1996 | Malkamaki et al. | |
| 5,754,946 A | * | 5/1998 | Cameron et al. | 340/7.22 |
| 6,587,672 B1 | * | 7/2003 | Chuah et al. | 455/69 |
| 2003/0012195 A1 | * | 1/2003 | Ohkubo et al. | 370/390 |

FOREIGN PATENT DOCUMENTS

EP    0 802 696    10/1997

OTHER PUBLICATIONS

H. Rohling, et al., Vehicular Technology Conference, Mobile Technology for the Human Race, XP–010162661, pp. 1589–1593, "Performance of an OFDM–TDMA Mobile Communication System", Apr. 28, 1996.

T. Kumagai, et al., Personal, Indoor and Mobile Radio Communications, XP–010314535, pp. 528–532, "A Maximal Ratio Combining Frequency Divesity ARQ Scheme for OFDM Signals", Sep. 8, 1998.

Y. Yamauchi, IEEE VTC' 90, pp. 366 to 371, "Reliable Multicast Over the Mobile Packet Radio Channel", 1990.

* cited by examiner

Primary Examiner—Don N. Vo
(74) Attorney, Agent, or Firm—Oblon, Spivak, McClelland, Maier & Neustadt, P.C.

(57) ABSTRACT

There is disclosed a multicast transmission system in which an efficient and highly reliable multicast transmission can be performed. In the multicast transmission system for performing multicast transmission to a plurality of terminal stations from a base station, when an error is detected in the terminal station, the terminal station utilizes some of sub-carriers constituting an OFDM symbol to generate and transmit a NAK signal to the base station. A level judgment section 25 in the base station resends a packet to each terminal station when a reception signal level exceeds a threshold. Since the number M of sub-carriers able to be utilized to generate the NAK signal and the number L of sub-carriers necessary for generating the NAK signal are determined based on the number of terminal stations, packet communication quality, and the like, an erroneous detection probability and detection miss probability of the NAK signal can both be lowered.

20 Claims, 9 Drawing Sheets

BASE STATION CONSTITUTION

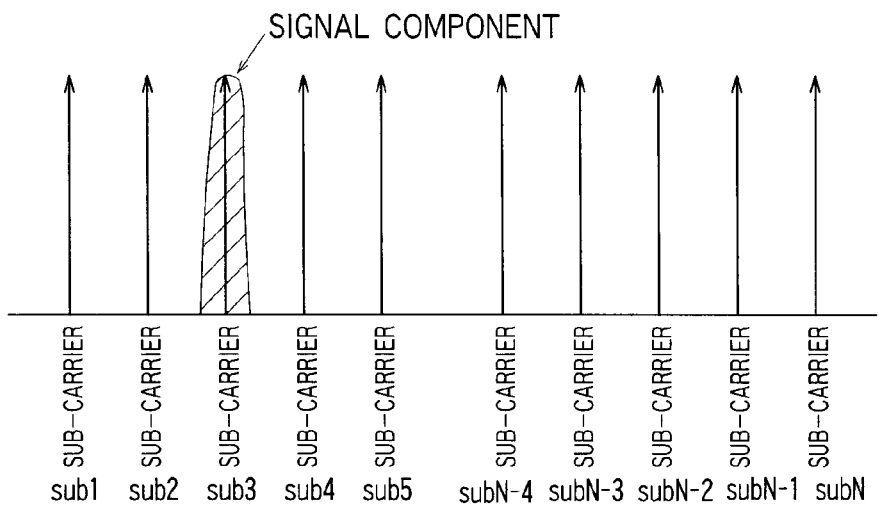
FIG. 3
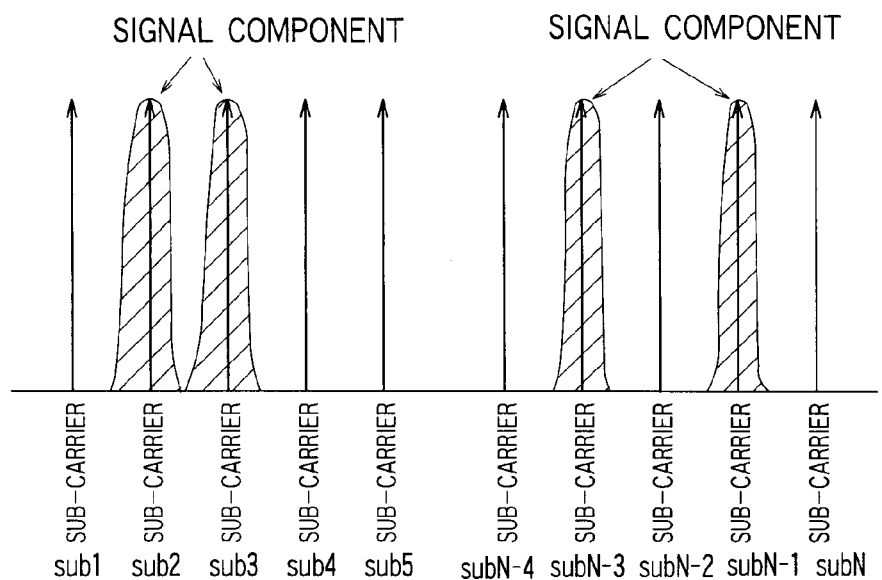
FIG. 4
| M SMALL | ERRONEOUS DETECTION PROBABILITY IS LOW |
| L LARGE | DETECTION MISS PROBABILITY IS LOW |
| M SMALL, L LARGE | NAK SIGNAL COLLISION EASILY OCCURS |
| M LARGE, L SMALL | NAK SIGNAL COLLISION DOES NOT EASILY OCCUR |
FIG. 5

BASE STATION CONSTITUTION

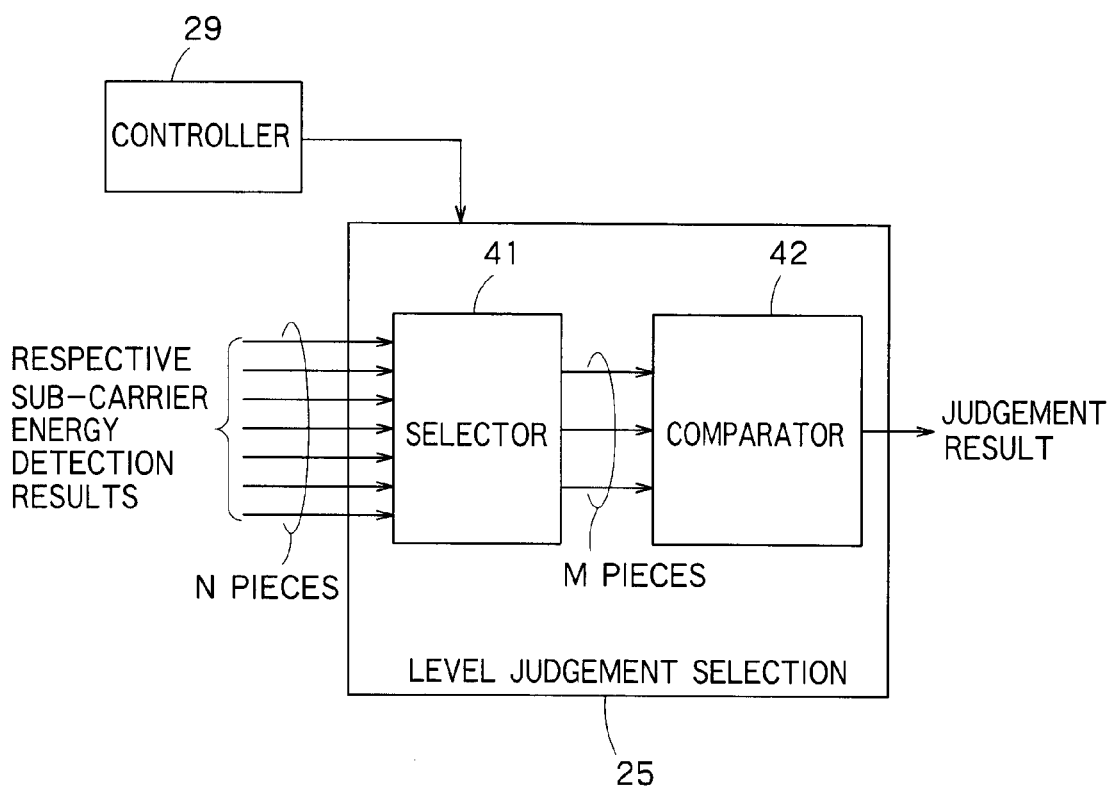
F I G. 8

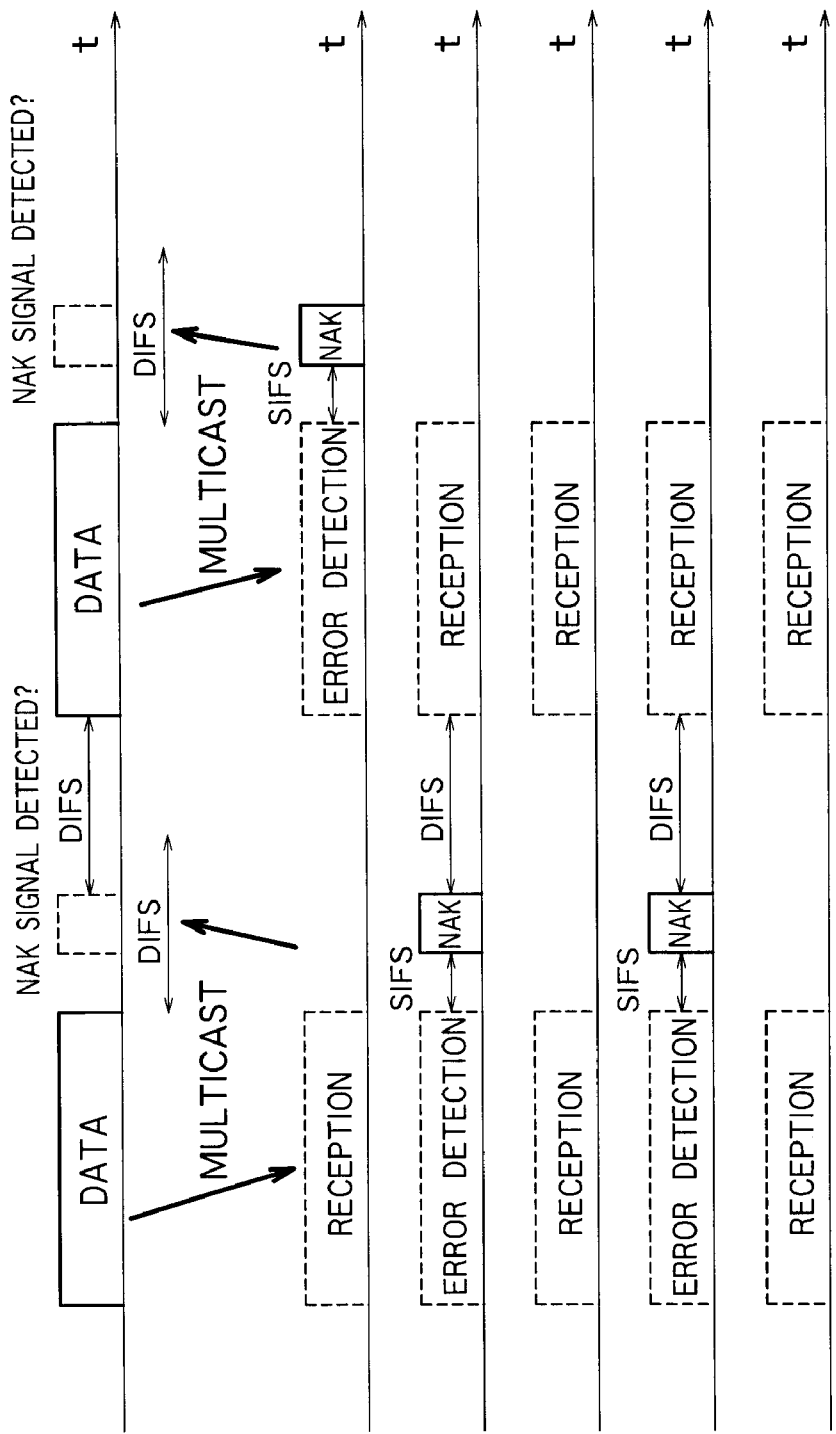
F I G. 11

RADIO COMMUNICATION SYSTEM, RADIO COMMUNICATION METHOD, RADIO BASE STATION, AND RADIO TERMINAL STATION

CROSS REFERENCE TO RELATED APPLICATIONS

The subject application is related to subject matter disclosed in Japanese Patent Application No. H11-275225 filed on Sep. 28, 1999 in Japan to which the subject application claims priority under Paris Convention and which is incorporated herein by reference.

BACKGROUND OF THE INVENTION

1. Field of the Invention

The present invention relates to a data transmission method in radio multicast communication. Particularly, the present invention relates to a radio multicast communication in which when an error is detected in a multicast-transmitted packet, a negative acknowledgment (hereinafter referred to as NAK) is returned as a response to a base station to thereby perform a request for resending.

2. Related Background Art

When performing multicast communication in a radio communication system, there is an advantage that all terminal stations able to communicate with a base station can transmit/receive information and the information can be transmitted to all the terminal stations at one transmission. However, on the other hand, when performing a request for resending because of an error generated in a transmission line, if a plurality of terminal stations simultaneously perform requests for resending, there is a problem that the requests collide against one another on a radio circuit and resending request (NAK) information is not correctly transmitted.

The problem about signal collision caused when the plurality of terminal stations utilize the same circuit is well known as a multi-access problem, and various solution methods have been proposed.

For example, a transmission right control system of issuing signal transmission rights for transmission acknowledgment (Japanese Patent Application Laid-Open No. 46161/1999), a system of transmitting a NAK signal provided with a packet number not normally received by random access when an error is generated in a reception signal (Japanese Patent Application Laid-Open No. 210031/1998), and a system of transmitting a burst signal as the NAK signal to a time position corresponding to the packet number when the error of the reception signal is detected (Japanese Patent Application Laid-Open No. 53089/1993) are known.

In the first transmission right control system, transmission/reception of information for adjusting a returning timing of a resending request signal is necessary, and there is a problem that control is complicated. Moreover, in a mobile communication system in which the terminal station moves, since the terminal station as a multicast communication target changes, the control is further complicated.

In the second random access system, the resending request signal of the multicast communication is frequently generated in a plurality of terminal stations at the same time, a probability of occurrence of collision of the NAK signals is high and an efficiency is deteriorated. To reduce the collision, a back off time needs to be taken before the transmission of the NAK signal. However, when the number of multicast address terminal stations increases, the back off time needs to be increased, and efficiency deterioration attributed to the back off time cannot be ignored.

In the third burst signal system, similarly as the random access system, the probability of occurrence of collision is high. However, to detect a signal energy in the time position, even when the NAK signals from a plurality of terminal stations collide with one another, some signal energy is detected, and it can therefore be recognized that the corresponding packet is erroneously received by at least one terminal station. In this system, however, a signal energy detection precision raises a problem. For example, when two signals subjected to PSK modulation are received by a multipath with a phase deviating by 180 degrees, the signal energy becomes zero, and the base station as the multicast transmission station cannot detect that an error is generated in a reception station for receiving the packet.

Moreover, in the present system, since an erroneous packet is specified by the time position for transmitting the burst signal, with a detection miss (although the burst signal is received, it is judged that there is no burst signal) resending of the erroneous packet is not performed. In order to reduce the detection miss, when a threshold for detection is lowered, erroneous detection (although no burst signal is received, it is erroneously judged that there is a burst signal) is easily caused by influence of disturbances such as an undesirable noise, and unnecessary resending is performed.

That is, various solution methods of multiple access have been proposed, but there are problems such as a complicated control and an insufficient effect.

Incidentally, because of completion of IEEE 802.11 radio LAN standards in 1997, and advancement in price reduction of radio LAN, a large number of radio LAN products have been placed on the market.

At present, aiming at a higher speed of the radio LAN, in IEEE 802.11 committee, specifications of the radio LAN using a radio frequency of 5 GHz band are studied, and it is determined that an orthogonal frequency division multiplexing (OFDM) system strong against multipath interference is used as a transmission system.

On the other hand, in a current IEEE 802.11 resending control method, when performing unicast transmission for transmitting information to one specific terminal station, if the transmitted packet is correctly received, the terminal station returns an acknowledgment signal (hereinafter referred to as the ACK signal) after a time interval called a short interframe space (SIFS).

However, for the multicast communication including the multicast transmission, no acknowledgment is made in the specifications. Specifically, since the resending control in a radio link is not applied, reliability of information transmission is low in the multicast transmission, and further there is a problem that the data transmission efficiency is lowered by the resending control of an upper layer.

SUMMARY OF THE INVENTION

The present invention has been developed in consideration of the aforementioned problems, and an object thereof is to provide a multicast transmission system in which an efficient and highly reliable multicast transmission can be performed.

To achieve the aforementioned object, there is provided a radio communication system for performing transmission/reception of a packet in a multicarrier transmission system between a base station and a plurality of terminal stations, wherein each of the plurality of terminal stations comprises:
a receiver for receiving a multicast transmission packet transmitted to each of the terminal stations from the base station;
an error detector for detecting whether or not there is an error in the multicast transmission packet received by the receiver;
sub-carrier selector for selecting L (M≧L, L is an integer) pieces of sub-carriers from at least M (M≧1, M is an integer) pieces of sub-carriers included in a resending request signal to the multicast transmission packet; and
terminal station transmitter for transmitting a signal obtained by superposing a modulation signal only to the selected L pieces of sub-carriers as the resending request signal to the base station, and
the base station comprises:
a judgment section for judging, based on the resending request signal received from the plurality of terminal stations, whether or not the previously transmitted multicast transmission packet is resent; and
a resending section for resending the multicast transmission packet to the plurality of terminal stations when the judgment section judges that the multicast transmission packet is to be resent.

According to the present invention, since the resending request signal is generated using only some of the sub-carriers constituting a reception packet OFDM symbol, an erroneous detection probability and detection miss probability of the resending request signal can be reduced, and a highly reliable multicast transmission is possible.

Moreover, in the present invention, since OFDM transmission utilizes easy realization of orthogonality in a frequency axis, the system has a priority of realizing properties to the similar system utilizing the orthogonality in a time axis.

Furthermore, since the present invention can be applied not only to a concentrated control type radio system in which the base station performs allotment of a radio band but also to a random access radio system on the basis of CSMA, the present invention can also be applied to the existing IEEE 802.11 radio LAN system.

BRIEF DESCRIPTION OF THE DRAWINGS

FIG. 3 is a view showing one example of NAK signals transmitted by respective terminal stations.

FIG. 4 is a view showing one example of the NAK signals received by a base station.

FIG. 5 is a chart showing a size relation between L and M.

FIG. 8 is a block diagram showing an internal constitution of a level judgment section of FIG. 7.

FIG. 11 is a chart showing a transmission procedure of multicast transmission in the aforementioned first to third embodiments.

DETAILED DESCRIPTION OF THE PREFERRED EMBODIMENTS

A multicast transmission system according to the present invention will concretely be described hereinafter with reference to the drawings.

(First Embodiment)

In the multicast transmission system of the present invention, a base station simultaneously performs a multicast transmission of a packet to a plurality of terminal stations.

Figure 1:
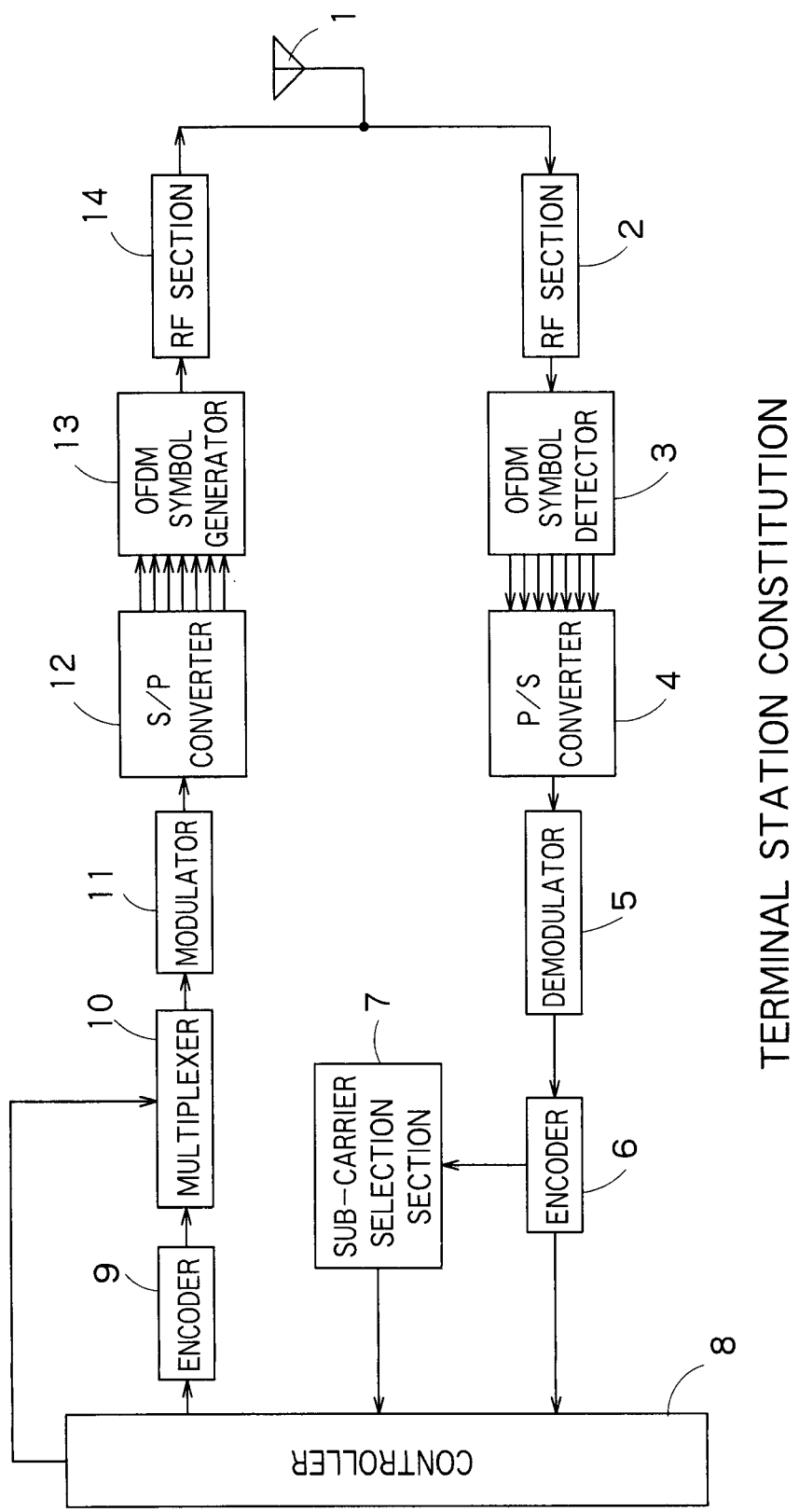
FIG. 1 is a block diagram showing a constitution of a terminal station of a first embodiment.
Figure 2:
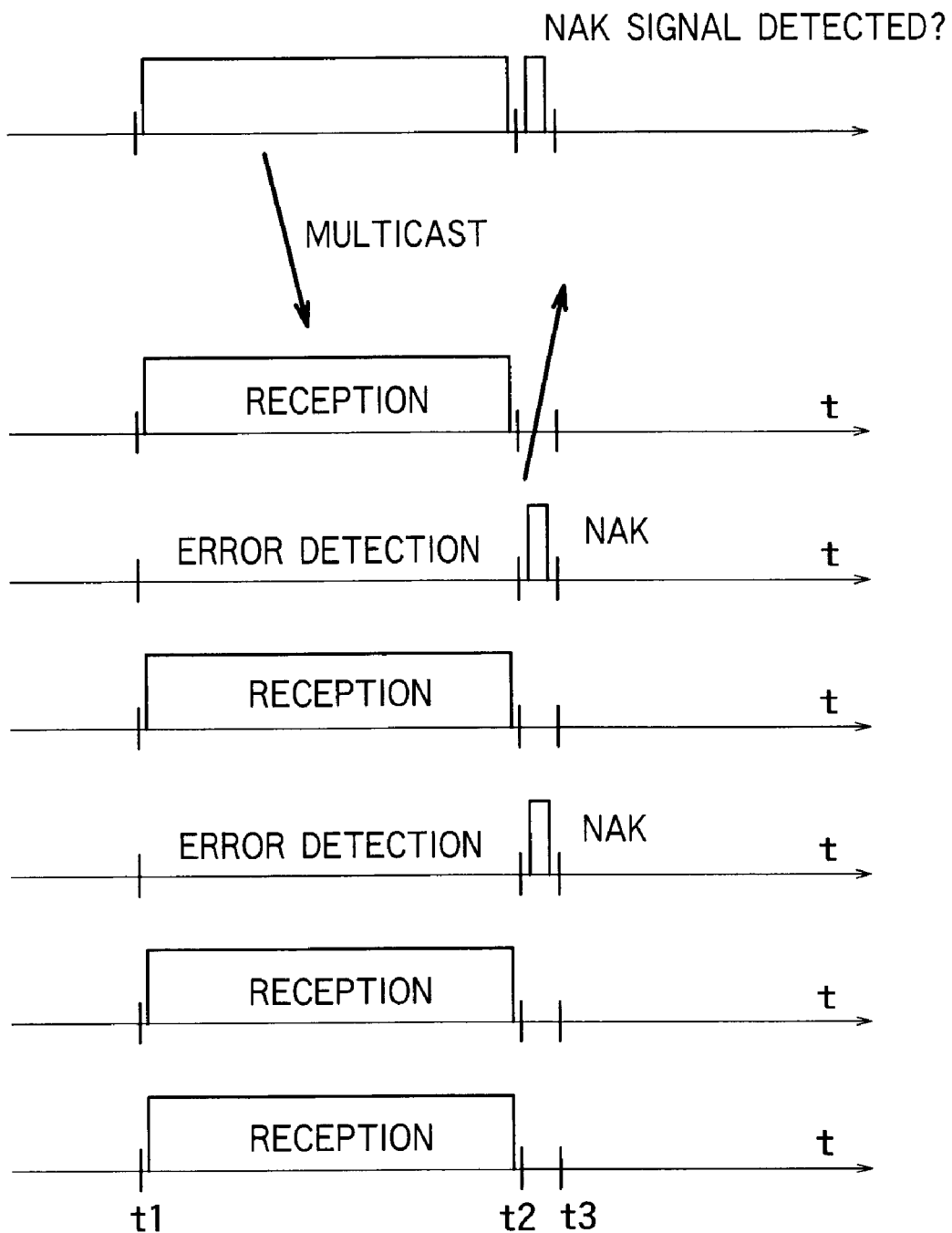
FIG. 2 is an explanatory view of a multicast transmission principle.

FIG. 1 is a block diagram showing a constitution of the terminal station of a first embodiment, and FIG. 2 is a view of explaining principle of a multicast transmission. Before describing the constitution of FIG. 1, an outline of the multicast transmission will be described with reference to FIG. 2.

The base station performs the multicast transmission of the packet simultaneously to a plurality of terminal stations (t1 to t2 of FIG. 2). Each terminal station detects an error of a reception packet by using CRC check and the like. As a result, when an error is detected in the reception packet, a NAK signal is generated.

The NAK signal is constituted of one OFDM symbol. Usually, the OFDM symbol is generated by superposing a modulation signal to N sub-carriers crossing at right angles to one another and performing an inverse Fourier transform (IFFT) processing, but in the present embodiment, one sub-carrier is utilized to generate the NAK signal (OFDM symbol). Additionally, a technique of generating the NAK signal will be described later in detail.

Since a time slot for the base station to perform the multicast transmission of the packet (t1 to t2 of FIG. 2), and a time slot for the terminal station to return the NAK signal to the packet (t2 to t3 of FIG. 2) are predetermined by advance procedure, each terminal station uses a designated time slot (t2 to t3 of FIG. 2) to transmit the NAK signal to the base station.

The first embodiment of the terminal station shown in FIG. 1 will next be described. The terminal station of FIG. 1, as a reception system constitution, is provided with an RF section 2 for down-converting a radio frequency signal received by an antenna 1 to perform orthogonal demodulation, an OFDM symbol detector 3 for performing FFT processing to an output of the RF section 2 to detect the OFDM symbol, a P/S converter 4 for performing a parallel/serial conversion of the OFDM symbol, a demodulator 5 for demodulating the serially converted OFDM symbol, an encoder (error detector) 6 for using the CRC check or the like to detect an error of a demodulation signal, a sub-carrier selection section (sub-carrier selector) 7 for selecting some sub-carriers when the error is detected, and a controller 8 for using the selected sub-carriers to generate the NAK signal.

The sub-carrier selection section 7 selects some (L) sub-carriers constituting the OFDM symbol. As a method of selecting the sub-carrier in the sub-carrier selection section 7, any method may be selected from a method of selecting the sub-carriers at random every time, a method of selecting the sub-carriers at random only at communication start and subsequently selecting the same sub-carriers, a method of selecting fixed sub-carriers, and the like.

The sub-carrier selection section 7 notifies the controller 8 of the selected sub-carriers. The controller 8 superposes the modulation signal only to the selected L sub-carriers, and generates a signal series such that other sub-carriers are null.

Moreover, the terminal station of FIG. 1, as a transmission system (terminal station transmitter) constitution, is provided with an encoder 9 for encoding a transmission signal to generate a signal series, a multiplexer 10 for multiplexing the respective signal series generated by the encoder 9 and controller 8, a modulator 11 for modulating a multiplexed signal, an S/P converter 12 for converting the modulation signal to a parallel signal, an OFDM symbol generator 13 for performing an IFFT processing to an output of the S/P converter 12 to generate the OFDM symbol, and an RF section 14 for modulating the OFDM symbol for up-conversion to a radio frequency, and an output of the RF section 14 is transmitted via the antenna 1.

The multiplexer 10 outputs the signal series generated by the encoder 9 when the controller 8 generates no NAK signal, and multiplexes the signal series generated by the encoder 9 with the signal series corresponding to the NAK signal when the controller 8 generates the NAK signal.

Additionally, the drawings show only a minimum constitution to describe the present invention, but for example, to perform interleave or forward error correction (FEC), an interleaver immediately after the encoder 9, a deinterleaver immediately before the encoder 6, and the like are necessary.

FIG. 3 is a chart showing one example of the NAK signals transmitted by the respective terminal stations, and shows an example in which when the total number of sub-carriers is N, and the number of the sub-carriers of the NAK signals is 1, only sub-carrier sub3 is used to transmit the NAK signal.

FIG. 4 is a chart showing one example of the NAK signals received by the base station. Each of diagonal line parts of FIG. 4 shows the NAK signal.

As shown in FIG. 4, when the sub-carriers of the NAK signals transmitted by the respective terminal stations are different from one another, a reception level of each sub-carrier fails to be lowered.

The present embodiment is characterized in that even when collision of the NAK signals occurs, the reception level of each sub-carrier fails to increase or decrease.

Therefore, in the present embodiment, during generation of the NAK signals by the respective terminal stations, a probability of selecting the same sub-carrier is set to be as small as possible. In order to minimize this probability, it is most preferable to set the number L of sub-carriers necessary for generating the NAK signal to 1, and set the number M of sub-carriers usable for generating the NAK signal to N (N is the total number of sub-carriers constituting the OFDM symbol).

However, when L is set to 1, M is set to N, communication quality is satisfactory, and no NAK signal is returned from the terminal station, an erroneous detection probability that although no NAK signal is present, the presence is erroneously judged increases. This is because the erroneous detection probability increases in proportion to a value of M. Therefore, from a viewpoint of the erroneous detection probability, M is preferably set to be as small as possible.

On the other hand, from a viewpoint of a detection miss probability judged that although the NAK signal is present, the NAK signal is not present, L is preferably set to be as large as possible. However, the larger M is and the smaller L is, the larger a possibility of selecting the same sub-carrier becomes.

A size relation between L and M described above is shown in FIG. 5. As seen from FIG. 5, in order to set optimum L and M, various conditions need to be taken into consideration.

Values of L and M are notified from the controller 8, but at least the value of M is finally determined by the base station, and the value of M determined by the base station is notified to the respective terminal stations. Additionally, here, the setting of M means not only the number of sub-carriers but also designation of the sub-carrier to be utilized.

Figure 6:
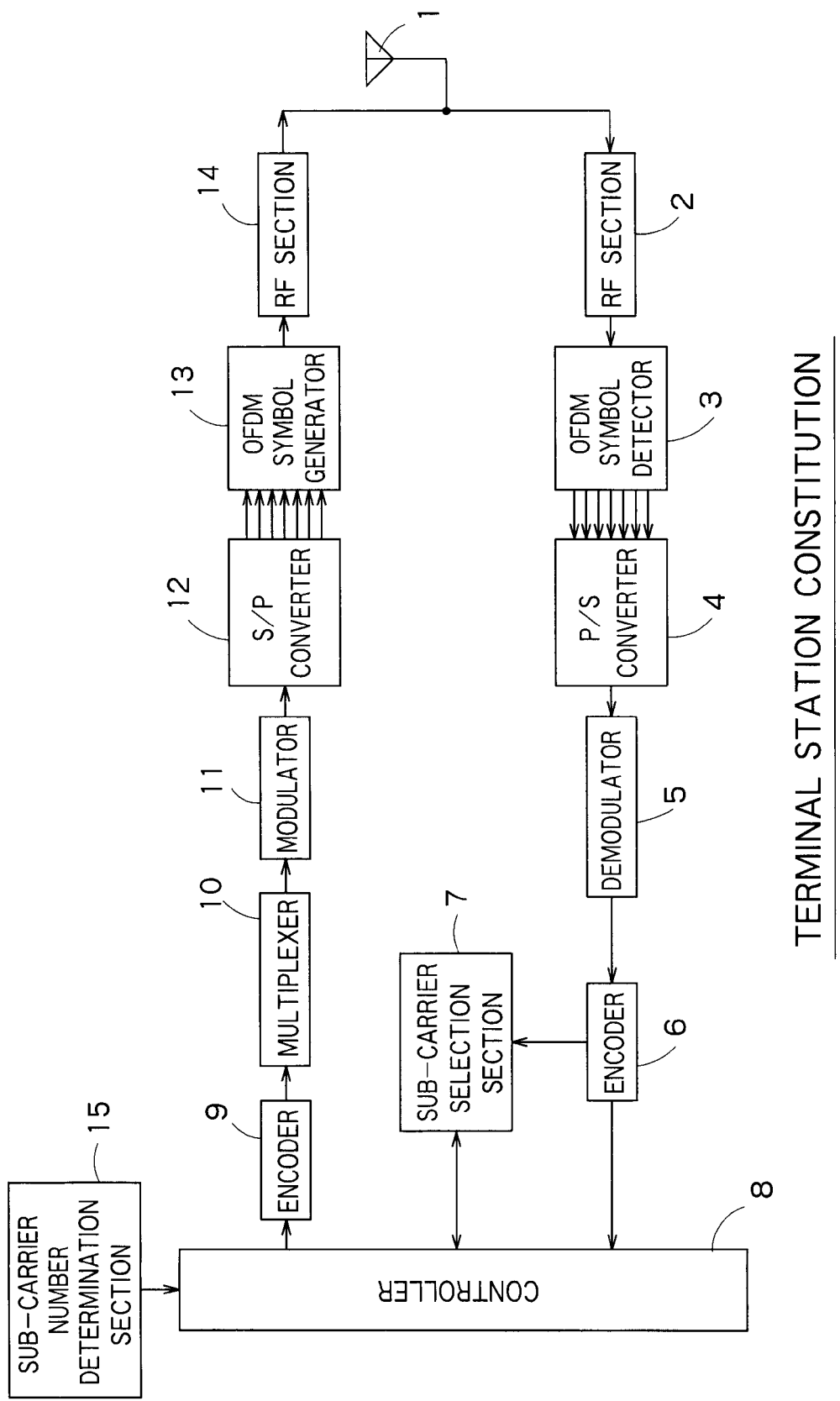
FIG. 6 is a block diagram showing the constitution of the terminal station when the terminal station determines a value of L.

On the other hand, the value of L may be determined by the base station or the terminal station. FIG. 6 is a block diagram showing the terminal station constitution in case that the terminal station determines the value of L. In FIG. 6, constituting parts common to FIG. 1 are denoted with the same reference numerals. The terminal station of FIG. 6 is constituted by adding a sub-carrier number determination section (sub-carrier number determination section) 15 to FIG. 1.

There are two techniques for the sub-carrier number determination section 15 of FIG. 6 to determine the value of L. In a first technique, only reception property of the packet is utilized. In this technique, the reception properties such as an error ratio property of the reception packet are measured, and L is increased with very satisfactory reception properties. Conversely, when the reception properties are deteriorated, L is decreased.

A second technique grasps the number of destination terminal stations of a multiple address packet in some method and by using the information, determines the value of L. As the method of grasping the number of destination terminal stations, a method of grasping the number of destination terminal stations from destination addresses of the multiple address packet, a method of notifying the number of destination terminal stations from the base station as information for determining L, and the like are exemplified.

For a method of determining L and M (M is between L and N), for example, when the number of terminal stations to perform the multicast transmission of the packet is sufficiently small with respect to the total number N of sub-carriers constituting the OFDM symbol, M is preferably decreased and L is increased. Thereby, both the erroneous detection probability and the detection miss probability can be reduced.

Moreover, even when the number of terminal stations to perform the multicast transmission is large as compared with the total number N of sub-carriers, but when it can be predicted that the number of terminal stations to return the NAK signals is small (e.g., when packet error ratio properties are very satisfactory), both the erroneous detection probability and the detection miss probability can be reduced by decreasing M and increasing L.

On the other hand, when the number of destination terminal stations to perform the multicast transmission is very large and the packet error ratio properties are insufficiently satisfactory, or when it can be predicted that the number of terminal stations to return the NAK signals is large, by increasing M and decreasing L, the probability of selecting the same sub-carrier is reduced, and both the erroneous detection probability and the detection miss probability can be reduced.

When L and M are determined in consideration of the number of terminal stations to perform the multicast transmission and communication qualities such as the packet error ratio in this manner, both the erroneous detection probability and the detection miss probability can be reduced.

Moreover, as the method of determining L and M, there is also a method of measuring a fluctuation of reception power for every sub-carrier in the NAK signal and feeding back the result. When the NAK signals generated by superposing signal components to the same sub-carrier collide with one another, for a phase relation with the same phase, the power is doubled, and with the reverse phase, the power becomes zero.

Conversely, when no signal component is superposed to the same sub-carrier, the power fluctuation is influenced only by a propagation line, heat noise, or the like.

Therefore, another method can be considered which comprises first decreasing L and increasing M, and gradually increasing L and decreasing M until the power fluctuation increases or a sufficient NAK detection probability is obtained.

Figure 7:
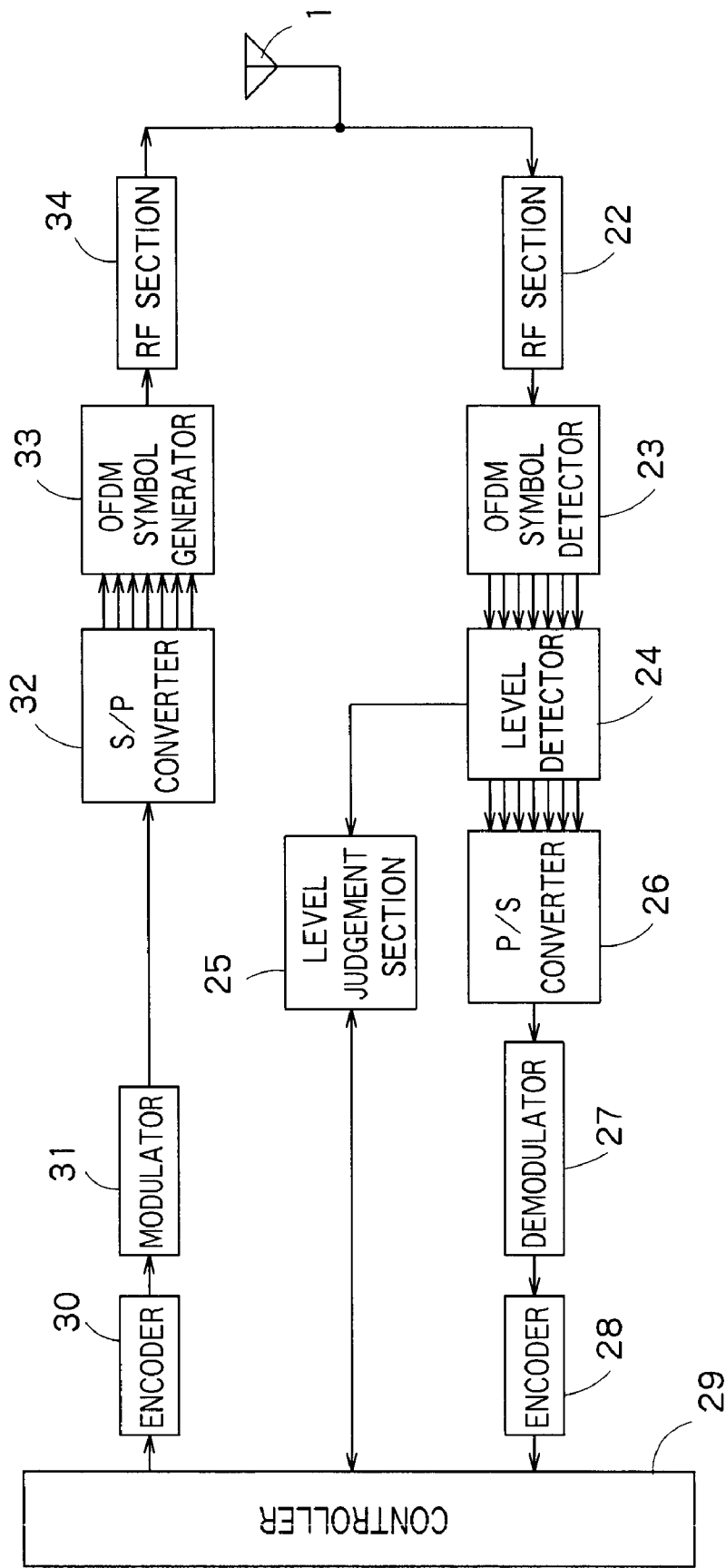
FIG. 7 is a block diagram showing a constitution of the base station of the first embodiment in which multicast transmission is performed to the terminal stations shown in FIGS. 1 and 6.

FIG. 7 is a block diagram showing a constitution of the base station to perform the multicast transmission with respect to the terminal station shown in FIGS. 1 and 6 according to the first embodiment. The base station of FIG. 7, as the reception system constitution, is provided with an RF section 22 for down-converting a radio frequency signal received by an antenna 21 to perform orthogonal demodulation, an OFDM symbol detector 23 for performing FFT processing to an output of the RF section 22 to detect the OFDM symbol, a level detector 24 for detecting a reception level of a signal component for each sub-carrier included in the OFDM symbol, a level judgment section (level judgment section) 25 for judging whether or not the reception level of each signal component is a preset threshold T or more, a P/S converter 26 for performing a parallel/serial conversion of the OFDM symbol, a demodulator 27 for demodulating the serially converted OFDM symbol, an encoder 28 for performing an error detection based on a demodulation signal, and a controller 29 for receiving the demodulation signal after the error detection.

The level judgment section 25 notifies the controller 29 to resend the packet corresponding to the NAK signal when the signal component level is the threshold or more. Upon receiving this notification, the controller 29 resends the packet to the respective terminal stations via the transmission system of FIG. 7.

The base station of FIG. 7, as a transmission system (base station resending section) constitution, is provided with: an encoder 30 for encoding a transmission signal to generate a signal series, a modulator 31 for modulating each signal series generated by the encoder 30, an S/P converter 32 for converting the modulation signal to a parallel signal, an OFDM symbol generator 33 for performing an IFFT processing to an output of the S/P converter 32 to generate the OFDM symbol, and an RF section 34 for orthogonally modulating the OFDM symbol for up-conversion to a radio frequency, and an output of the RF section 34 is transmitted via the antenna 21.

Additionally, FIG. 7 shows an example in which the resending packet is accumulated in the controller 29, but the controller 29 does not necessarily have to perform packet buffering. For example, the signal subjected to modulation by the modulator 31 or the OFDM symbol generated by the OFDM symbol generator may be buffered. In the buffering by sections other than the controller 29, the resending request from the level judgment section 25 may be transmitted to a buffering place.

Moreover, the reception level detected by the level detector 24 is not always transmitted to the level judgment section 25. When the multicast transmission is performed, the controller 29 grasps the time slot to which the NAK signal is returned, and only the level of the signal received in the time slot is therefore transmitted to the level judgment section 25.

Additionally, FIG. 7 shows only a minimum constitution to describe the present invention, but similarly as the terminal station, when performing interleave or error correction, an interleaver, a deinterleaver, and the like are necessary.

Moreover, the level judgment section 25 does not need to perform level detection of the reception signal in all N sub-carriers constituting the OFDM symbol. As described above, the number M of sub-carriers usable in the generation of the NAK signal not only means the number of sub-carriers, but also means the designation of the sub-carrier to be utilized. Therefore, the level judgment section 25 may perform the level detection only of M sub-carriers notified from the controller 29. Thereby, the erroneous detection probability of the NAK signal can be reduced.

FIG. 8 is a block diagram showing an internal constitution of the level judgment section 25 of FIG. 7. As shown in FIG. 8, the level judgment section 25 includes a selector 41 and a comparator 42. To the level judgment section 25 inputted are reception levels of all sub-carriers (N sub-carriers) detected by the level detector 24 of FIG. 7. The selector 41 in the level judgment section 25 selects M signals from N sub-carriers. The M signals are selected in accordance with the instruction from the controller 29.

The M signals selected by the selector 41 are inputted to the comparator 42. The comparator 42 judges whether or not the signal with the reception level of the preset threshold T or more is present. A comparison result by the comparator 42 is notified, for example, to the controller 29, and the controller 29 resends the packet subjected to buffering. As described above, when the packet buffering is performed by sections other than the controller 29, the judgment result is transmitted to the buffering place.

As described above, in the first embodiment, when the multicast transmission is performed to a plurality of terminal stations from the base station in the OFDM system, and when an error is detected in the reception packet received by the terminal station, the NAK signal generated by using some of the sub-carriers constituting the OFDM symbol is returned to the base station, and both the erroneous detection probability and detection miss probability of the NAK signal can therefore be reduced.

Moreover, since the number L of sub-carriers utilized for generating the NAK signal is determined in accordance with the number of terminal stations, the error ratio property of the packet, and the like, a highly reliable multicast transmission is possible.

Furthermore, the base station having received the NAK signal from the terminal station resends the transmission packet to the terminal station only when the reception level of the NAK signal exceeds the threshold T, and therefore there is no possibility that the transmission packet is erroneously resent to the terminal station.

(Second Embodiment)

In a second embodiment, the base station determines the number M of sub-carriers which can be utilized for generating the NAK signal.

Figure 9:
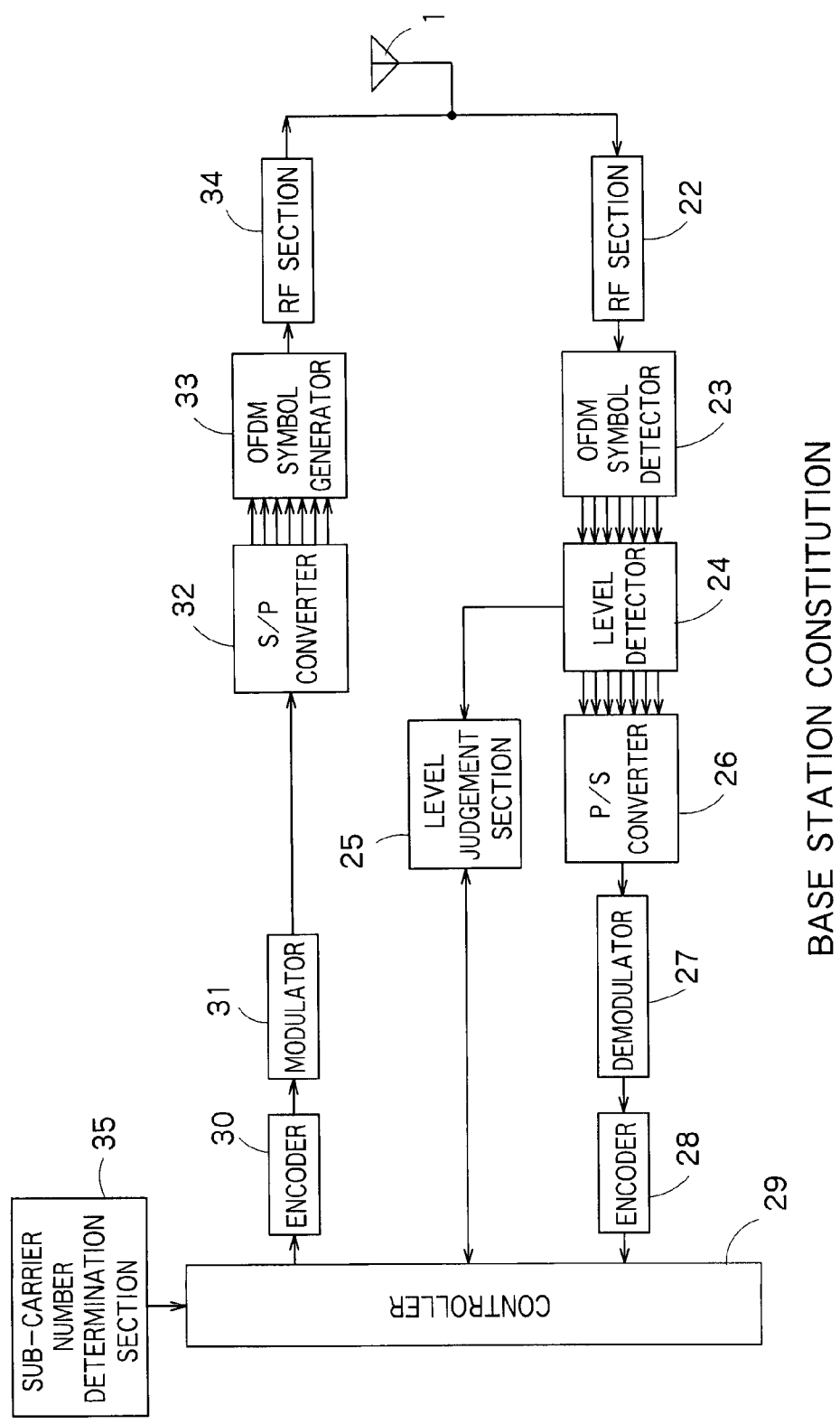
FIG. 9 is a block diagram showing a constitution of the base station of a second embodiment.

FIG. 9 is a block diagram showing a constitution of the base station of the second embodiment. In FIG. 9, constituting parts common to FIG. 7 are denoted with the same reference numerals, and different points will mainly be described hereinafter.

The base station of FIG. 9 is constituted by newly adding a sub-carrier number determination section (sub-carrier number determination section) 35 to FIG. 7.

The sub-carrier number determination section 35 determines at least one of the number M of sub-carriers which can be utilized to generate the NAK signal and the number L of sub-carriers actually utilized to generate the NAK signal.

When the terminal station is constituted as shown in FIG. 6, the sub-carrier number determination section 15 of FIG. 6 determines the number L of sub-carriers, and the sub-carrier number determination section 35 of FIG. 9 therefore determines only the number M of sub-carriers. On the other hand, when there is no sub-carrier number determination section 15 shown in FIG. 6 in the terminal station, the sub-carrier number determination section 35 of FIG. 9 determines both the numbers L and M of sub-carriers.

As described above, in the second embodiment, since the sub-carrier number determination section 35 is disposed inside the base station, the number L or M of sub-carriers can be changed in accordance with the number of terminal stations, packet error property, and the like, and both the erroneous detection probability and detection miss probability of the NAK signal can be reduced.

(Third Embodiment)

In a third embodiment, the threshold as a reference of detection of the NAK signal is changed in accordance with the number L, M of sub-carriers.

Figure 10:
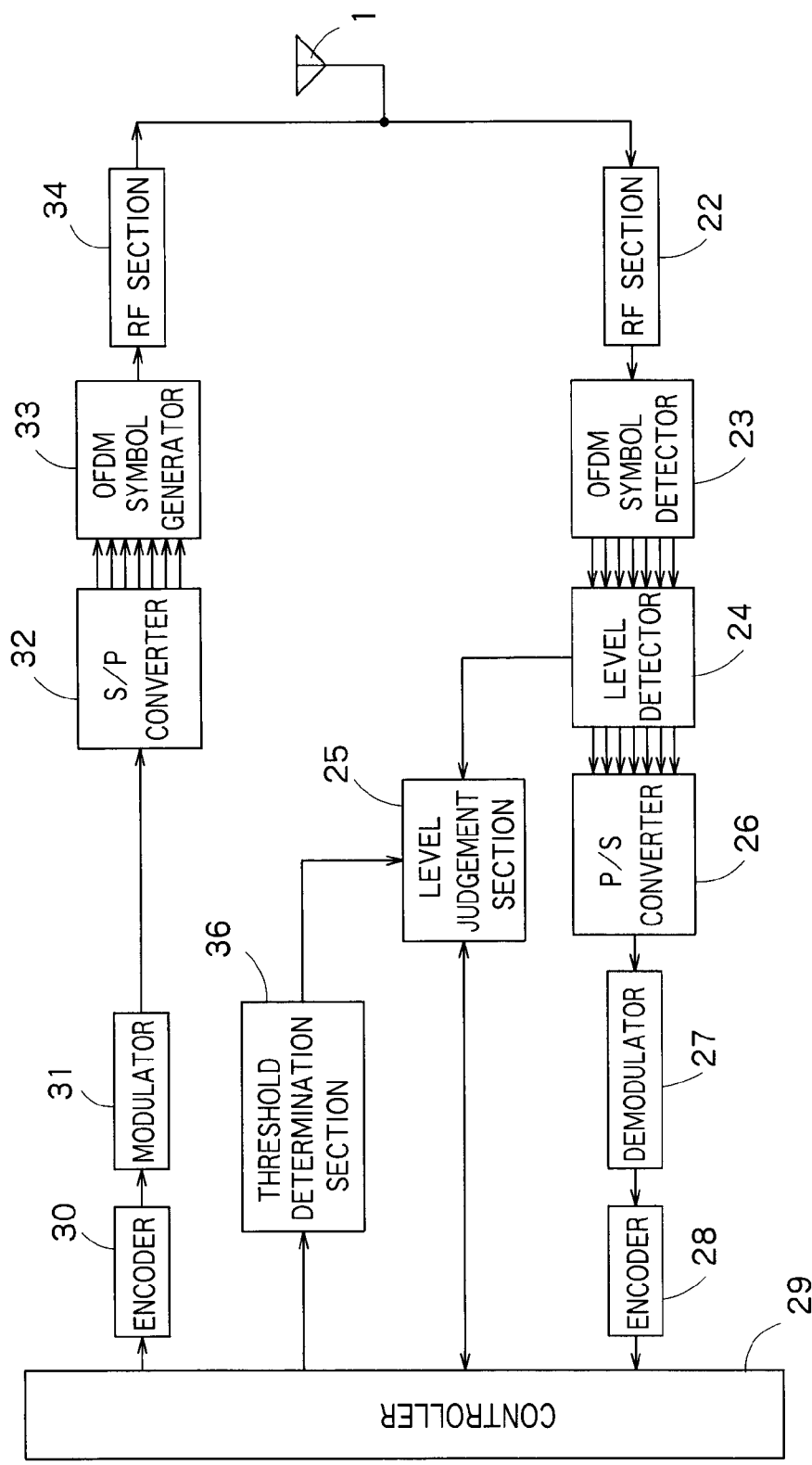
FIG. 10 is a block diagram showing a constitution of the base station of a third embodiment.

FIG. 10 is a block diagram showing a constitution of the base station of the third embodiment. In FIG. 10, constituting parts common to FIG. 7 are denoted with the same reference numerals, and different respects will mainly be described hereinafter.

The base station of FIG. 10 is constituted by newly adding a threshold determination section (threshold determination section) 36 to FIG. 7.

Generally, when the number M of sub-carriers able to be utilized to generate the NAK signal is small, and the number L necessary for generating the NAK signal is large, collision of the NAK signals easily occurs, and the threshold is preferably increased. By increasing the threshold, the erroneous detection probability is lowered, and with a large L the detection miss probability is also lowered.

In this case, the threshold determination section 36 of FIG. 10 determines the threshold T based on at least one of the numbers L, M of sub-carriers notified from the controller 29, and notifies the level judgment section 25 of the value. The level judgment section 25 performs the detection of the NAK signal based on the threshold T. Specifically, only when the reception level exceeds the threshold T, it is judged that the NAK signal is received.

As described above, in the third embodiment, since the value of the threshold T for judging the presence/absence of reception of the NAK signal is set based on at least one of the numbers L, M of sub-carriers, the erroneous detection probability of erroneously judging that the NAK signal is received can be lowered. Moreover, since the threshold T is set in relation to the number L of sub-carriers necessary for generating the NAK signal, the detection miss probability can also be lowered.

Moreover, the sub-carrier number determination section 35 of FIG. 9 and the threshold determination section 36 of FIG. 10 may be added to the base station constituted as shown in FIG. 7. Thereby, the number L, M of sub-carriers and the threshold T can simultaneously be controlled, and communication quality during the multicast transmission can further be enhanced.

In the aforementioned first to third embodiments, an example has been described in which the level detection section 24 in the base station detects the reception signal level of the NAK signal for every sub-carrier based on the output of the OFDM symbol detector 3, but as another example, the presence/absence of NAK signal may be judged based on the detection result of the reception signal level of the OFDM signal with a time waveform before the orthogonal demodulation in the RF section 2. In this case, however, a reception signal level detection range has to be enlarged.

(Transmission Procedure of Multicast Transmission)

FIG. 11 shows a transmission procedure of the multicast transmission in the aforementioned first to third embodiments. The base station performs carrier sensing before transmitting the packet, judges idleness for a first time interval called a distributed coordination function interframe space (DIFS), then transmits the packet by the multicast transmission. This procedure is similar to that of the unicast transmission defined by IEEE 802.11.

Each terminal station having received the packet from the base station detects the error of the received packet, and generates the NAK signal similarly as the first embodiment when the error is detected. Moreover, after receiving the multicast-transmitted packet, the terminal station transmits the NAK signal after elapse of a second time interval called a short interframe space (SIFS).

After transmitting the packet by the multicast transmission, the base station waits for the elapse of the SIFS time before starting the detection of the reception signal level. Moreover, after the packet transmission, the base station resends the previously transmitted packet when the reception signal level detected before the elapse of the DIFS time reaches the threshold T or more described in the first embodiment. If the reception signal level is less than the threshold T, the resending of the packet is not performed.

As described above, the present invention can be applied also to the system of the CSMA base like the IEEE 802.11. Additionally, L, M, and the like are set similarly as the first embodiment.

What is claimed is:

1. A radio communication system configured to perform transmission/reception of a packet in a multicarrier transmission system between a base station and a plurality of terminal stations, wherein each of said plurality of terminal stations comprises:
  a receiver configured to receive a multicast transmission packet transmitted to each of said terminal stations from said base station;
  an error detector-configured to detect whether or not there is an error in said multicast transmission packet received by the receiver;
  a sub-carrier selector configured to select L ($M \geq L$, L is an integer) pieces of sub-carriers from at least M ($M \geq 1$, M is an integer) pieces of sub-carriers included in a resending request signal for said multicast transmission packet; and
  terminal station transmission configured to transmit, to said base station, a signal obtained by superposing a modulation signal only to said selected L pieces of sub-carriers as the resending request signal, and said base station comprises:
  a judgment section configured to judge, based on the resending request signal received from said plurality of terminal stations, whether or not the previously transmitted multicast transmission packet is resent; and
  a resending section configured to resend said multicast transmission packet to said plurality of terminal stations when said judgment section judges that the multicast transmission packet is to be resent.

2. The radio communication system according to claim 1 wherein said multicarrier transmission system is an orthogonal frequency division multiplexing (OFDM) system,
   said sub-carrier selector selects said L pieces of sub-carriers from said at least M pieces of sub-carriers included in an OFDM signal for transmission which is the resending request signal for said multicast transmission packet, and
   said terminal station transmitter transmits, to said base station, the OFDM signal obtained by superposing the modulation signal only to said selected L sub-carriers as the resending request signal.

3. The radio communication system according to claim 1 wherein said base station further comprises a level judgment section configured to judge whether or not a reception signal level of said received resending request signal is a preset threshold or more, and
   resents said multicast transmission packet by said resending section only when it is judged that the reception signal level is said threshold or more.

4. The radio communication system according to claim 3 wherein said base station has a threshold determination section configured to determine said threshold based on at least one value of said L and said M in said sub-carrier selector.

5. The radio communication system according to claim 3 wherein said base station has a controller configured to control a timing at which said level judgment section perform level judgment, and
   said level judgment section performing the level judgment only at the timing indicated by said controller.

6. The radio communication system according to claim 1 wherein said terminal station comprises a sub-carrier number determination section configured to determine a value of said L based on at least one of the number of said terminal stations as destinations of the multicast transmission packet and packet communication quality.

7. The radio communication system according to claim 6 wherein said sub-carrier number determination section increase the value of said L and decrease the value of said M when the number of said terminal stations for returning said resending request signal decreases.

8. The radio communication system according to claim 6 wherein said sub-carrier number determination section decrease the value of said L and increase the value of said M when the number of said terminal stations for returning said resending request signal increases.

9. The radio communication system according to claim 6 wherein said sub-carrier number determination section determine the value of said L and the value of said M by taking a power fluctuation into consideration.

10. The radio communication system according to claim 1 wherein said base station comprises a sub-carrier number determination section configured to determine a value of at least one of said L and said M based on at least one of the number of said terminal stations as destinations of the multicast transmission packet and a quality of packet communication with said terminal stations.

11. The radio communication system according to claim 10 wherein said sub-carrier number determination section increase the value of said L and decrease the value of said M when the number of said terminal stations for returning said resending request signal decreases.

12. The radio communication system according to claim 10 wherein said sub-carrier number determination section decrease the value of said L and increase the value of said M when the number of said terminal stations for returning said resending request signal increases.

13. The radio communication system according to claim 10 wherein said sub-carrier number determination section determine the value of said L and the value of said M by taking a power fluctuation into consideration.

14. The radio communication system according to claim 3 wherein when an error is detected in the packet received from said base station, said terminal station transmitter transmit said resending request signal to said base station after elapse of a first time interval from reception of the packet, and
   after said base station performs multicast transmission of the packet to said plurality of terminal stations, said level judgment section perform packet resending only when the reception signal level received before elapse of a second time interval longer than said first time interval is said threshold or more.

15. A multicast transmission method of using a multicarrier transmission system to perform transmission/reception of a packet between a base station and a plurality of terminal stations,
   wherein each of said plurality of terminal stations comprises steps of:
      receiving a multicast transmission packet transmitted to each of said terminal stations from said base station;
      detecting whether or not there is an error in said received multicast transmission packet;
      selecting L ($M \geq L$, L is an integer) sub-carriers from at least M ($M \geq 1$, M is an integer) sub-carriers included in a resending request signal to said multicast transmission packet; and
      transmitting, to said base station, a signal obtained by superposing a modulation signal only to said selected L sub-carriers as the resending request signal, and
   said base station comprises steps of:
      judging, based on the resending request signal received from said plurality of terminal stations, whether or not said previously multiple-address transmitted multicast transmission packet is resent; and
      resending said multicast transmission packet to said plurality of terminal stations when it is judged that the multicast transmission packet is to be resent.

16. The multicast transmission method according to claim 15 wherein said multicarrier transmission system is an orthogonal frequency division multiplexing (OFDM) system,
   said step of selecting the sub-carriers selects said L sub-carriers from said at least M sub-carriers included in an OFDM signal for transmission which is the resending request signal to said multicast transmission packet, and
   said step of transmitting said resending request signal to said base station transmits, to said base station, the OFDM signal obtained by superposing the modulation signal only to said selected L sub-carriers as the resending request signal.

17. A radio base station for performing transmission/reception of a packet to a plurality of terminal stations in a multicarrier transmission system, the radio base station comprising:
   a level judgment section configured to judge whether or not a reception signal level of a resending request signal is a preset threshold or more, said resending request signal being transmitted from at least one of said plurality of terminal stations and obtained by superposing a modulation signal only to L (M≧L, L is an integer) pieces of sub-carriers selected from at least M (M≧1, M is an integer) pieces of sub-carriers; and a resending section configured to resend a multicast transmission packet to said plurality of terminal stations only when it is judged that the reception signal level is said threshold or more.

18. The radio base station according to claim 17 wherein said multicarrier transmission system is an orthogonal frequency division multiplexing (OFDM) system, and said level judgment section judge whether or not the reception signal level of the resending request signal is the preset threshold or more when said resending request signal obtained by superposing the modulation signal only to the L (M≧L, L is an integer) pieces of sub-carriers selected from at least M (M≧1, M is an integer) pieces of sub-carriers included in an OFDM signal is received.

19. A radio terminal station configured to perform transmission/reception of a packet with a base station in a multicarrier transmission system, said radio terminal station comprising:

a receiver configured to receive a multicast transmission packet transmitted from said base station;

an error detector configured to detect whether or not there is an error in said multicast transmission packet received by the receiver;

a sub-carrier selector configured to select L (M≧L, L is an integer) pieces of sub-carriers from at least M (M≧1, M is an integer) pieces of sub-carriers included in a transmission signal as a resending request signal to said multicast transmission packet; and terminal station transmitter configured to transmit, to said base station, a signal obtained by superposing a modulation signal only to said selected L sub-carriers as the resending request signal.

20. The radio terminal station according to claim 19 wherein said multicarrier transmission system is an orthogonal frequency division multiplexing (OFDM) system, said sub-carrier selector select the L (M≧L, L is an integer) pieces of sub-carriers from at least M (M≧1, M is an integer) pieces of sub-carriers included in an OFDM signal for transmission which is the resending request signal to said multicast transmission packet, and said terminal station transmitter transmit, to said base station, the OFDM signal obtained by superposing the modulation signal only to said selected L sub-carriers as the resending request signal.

* * * * *